US012762799B2

(12) United States Patent
Zhang et al.

(10) Patent No.: US 12,762,799 B2
(45) Date of Patent: Oct. 13, 2026

(54) DATA PROCESSING METHOD, ELECTRONIC DEVICE, AND STORAGE MEDIUM

(71) Applicant: Lenovo (Beijing) Limited, Beijing (CN)

(72) Inventors: Guannan Zhang, Beijing (CN); Chao Qi, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 373 days.

(21) Appl. No.: 18/232,730

(22) Filed: Aug. 10, 2023

(65) Prior Publication Data

US 2024/0112405 A1 Apr. 4, 2024

(30) Foreign Application Priority Data

Sep. 30, 2022 (CN) ......................... 202211218227.4

(51) Int. Cl.
*G06T 19/00* (2011.01)
*G06T 7/70* (2017.01)

(52) U.S. Cl.
CPC ................ *G06T 19/00* (2013.01); *G06T 7/70* (2017.01)

(58) Field of Classification Search
CPC .................................. G06T 19/00; G06T 7/70
USPC .......................................................... 345/419
See application file for complete search history.

(56) References Cited

U.S. PATENT DOCUMENTS

| | | | | |
|---|---|---|---|---|
| 2014/0098137 A1* | 4/2014 | Fein | G06T 11/00 345/633 |
| 2018/0234612 A1* | 8/2018 | Kunkel | H04N 23/62 |
| 2021/0038985 A1* | 2/2021 | Stebbins | A63F 13/5258 |

* cited by examiner

*Primary Examiner* — Hai Tao Sun
(74) *Attorney, Agent, or Firm* — ANOVA LAW GROUP, PLLC

(57) ABSTRACT

A data processing method, an electronic device, and a non-transitory computer readable storage medium are provided. The method includes: obtaining a first output image about a first space in a virtual space based on a first value, an output parameter being the first value and the first space including a target object; in response to a first condition being met, adjusting the output parameter from the first value to a second value; and after the output parameter is adjusted to be the second value, obtaining a second output image of a second space in the virtual space based on the second value, the second space including the target object.

20 Claims, 9 Drawing Sheets

DATA PROCESSING METHOD, ELECTRONIC DEVICE, AND STORAGE MEDIUM

CROSS-REFERENCE TO RELATED APPLICATION

This application claims priority to Chinese Patent Application No. 202211218227.4, filed on Sep. 30, 2022, the content of which is incorporated herein by reference in its entirety.

TECHNICAL FIELD

The present disclosure generally relates to the field of information technologies and, more particularly, to a data processing method and a data processing device.

BACKGROUND

With the advancement of science and technology, virtual digital scenes emerged as a new form of the Internet. When an observed object is embedded in a virtual digital scene and a viewing angle follows movement of the observed object, the display effect of the observed object may not meet the user's viewing needs. There is currently no suitable solution for this problem.

SUMMARY

In accordance with various embodiments of the present disclosure, there is provided a data processing method. The method includes: obtaining a first output image about a first space in a virtual space based on a first value, an output parameter being the first value and the first space including a target object; in response to a first condition being met, adjusting the output parameter from the first value to a second value; and after the output parameter is adjusted to be the second value, obtaining a second output image of a second space in the virtual space based on the second value, the second space including the target object.

Also in accordance with various embodiments of the present disclosure, there is provided an electronic device. The device includes a processor, a memory, and a communication bus. The communication bus is configured to realize a communication connection between the process and the memory. The memory is configured to store an information processing program. The processor is configured to execute the information processing program stored in the memory, to: obtain a first output image about a first space in a virtual space based on a first value, an output parameter being the first value and the first space including a target object; in response to a first condition being met, adjust the output parameter from the first value to a second value; and after the output parameter is adjusted to be the second value, obtain a second output image of a second space in the virtual space based on the second value, the second space including the target object.

Also in accordance with various embodiments of the present disclosure, there is provided a non-transitory computer readable storage medium, configured to store an information processing program. The information processing program is configured to be executed by a device where the non-transitory computer readable storage medium is located, to control the device to: obtain a first output image about a first space in a virtual space based on a first value, an output parameter being the first value and the first space including a target object; in response to a first condition being met, adjust the output parameter from the first value to a second value; and after the output parameter is adjusted to be the second value, obtain a second output image of a second space in the virtual space based on the second value, the second space including the target object.

BRIEF DESCRIPTION OF THE DRAWINGS

To clearly illustrate the embodiments of the present disclosure or the technical solutions in the existing technologies, the accompanying drawings that need to be used in the description of the embodiments or the existing technologies are described briefly below. The following drawings are merely examples for illustrative purposes according to various disclosed embodiments and are not intended to limit the scope of the present disclosure. For those ordinary skilled in the art, other drawings can also be obtained from the provided drawings without any creative effort.

DETAILED DESCRIPTION OF THE EMBODIMENTS

Hereinafter, embodiments and features consistent with various embodiments of the present disclosure will be described with reference to drawings. Various modifications may be made to the embodiments of the present disclosure. Thus, the described embodiments should not be regarded as limiting, but are merely examples. Those skilled in the art will envision other modifications within the scope and spirit of the present disclosure.

Apparently, the described embodiments are only some of the embodiments of the present disclosure, not all of them. Based on the embodiments in the present application, all other embodiments obtained by those skilled in the art without creative work, belong to the scope of protection of this disclosure.

The terms “first” and “second” in the description and claims of the present disclosure and the above drawings are used to distinguish different objects, rather than to describe a specific order. Furthermore, the terms “include” and “have”, as well as any variations thereof, are intended to cover a non-exclusive inclusion. For example, a process, method, system, product or device comprising a series of steps or units is not limited to the listed steps or units, but optionally also includes steps or units not listed, or optionally further includes other steps or units inherent in these processes, methods, products or devices.

Reference herein to an “embodiment” means that a particular feature, structure, or characteristic described in connection with the embodiment can be included in at least one embodiment of the present application. The occurrences of this phrase in various places in the specification are not necessarily all referring to the same embodiment, nor are separate or alternative embodiments mutually exclusive of other embodiments. It is understood explicitly and implicitly by those skilled in the art that the embodiments described herein can be combined with other embodiments.

To allow display effect of an observed object in a virtual digital scene to meet viewing needs of a user, the user needs to manually adjust output parameters, and some applications do not even provide options to adjust the output parameters. To at least solve such problems, various embodiments of the present disclosure provide methods, devices, electronic device, and computer readable storage medium for data processing.

Figure 1:
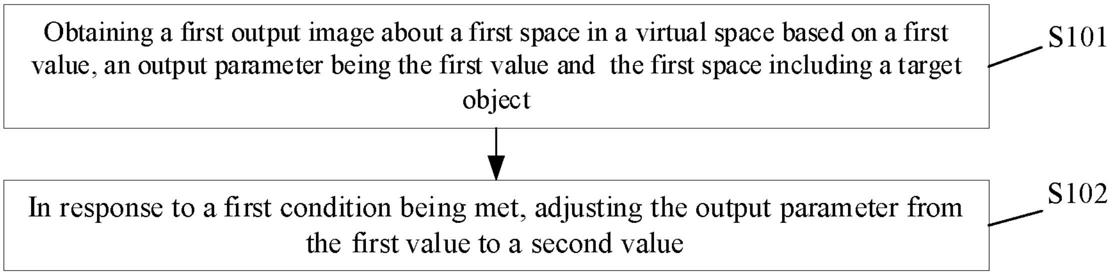
FIG. 1 is a schematic flowchart of an exemplary data processing method consistent with various embodiments of the present disclosure.

The present disclosure provides a data processing method. As shown in FIG. 1, in one embodiment, the method may include S101 and S102.

In S101, a first output image about a first space in a virtual space may be obtained based on a first value, where an output parameter may be the first value and the first space includes a target object.

In one embodiment, the virtual space may be a virtual three-dimensional environment displayed (or provided) when a corresponding application program runs on an electronic device, and the application program may be a browser application, a client application, and the like. The virtual space may be a simulation space of the real world, or the virtual space may be a semi-simulation and semi-fictional three-dimensional space, or the virtual space may also be a purely fictional three-dimensional space. The virtual space may include but is not limited to a high-dimensional virtual space such as a three-dimensional virtual space or a four-dimensional virtual space. The present embodiment where the virtual space is a three-dimensional virtual space is used as an example only to illustrate the present disclosure, but does not limit the scope of the present disclosure. The electronic device may be a device with a data processing function. That is, the electronic device may include a processing unit, and may be a mobile phone, a computer, etc. In addition to the processing unit, the electronic device may further include a display unit, and the display unit may display the target content based on the instructions of the display unit.

The application program may be an application program capable of supporting the display of a virtual space, and the virtual space may include virtual objects. Optionally, in one embodiment, the application program may be an application program capable of supporting the three-dimensional virtual space. The application program may be any one of a virtual reality (VR) application program or an augmented reality (AR) application program. Optionally, in some other embodiments, the application program may also be a three-dimensional (3D) game program. The present disclosure has no limit on this. A virtual object may be a three-dimensional solid model created based on animation skeleton technology. A virtual object may have its own shape and volume in the three-dimensional virtual space, and may occupy a part of the three-dimensional virtual space.

The output parameter may include but is not limited to a reference point parameter, such as a reference point position. The reference point may be a camera used to collect images about the virtual space for generating a final output image by a rendering engine. Therefore, the images captured by the reference point may determine the content of the image output.

The output parameter may also include other parameters able to affect the output image. For example, the parameters may include the field of view angle of the reference point (that is, FOV), a depth of field of the reference point, etc. The present disclosure has no limit on this. For the convenience of understanding, the reference point in the following embodiments of the present disclosure refers to the camera, and the reference point parameter refers to the position of the reference point, which is the position of the camera.

The first space may be a space where the reference point is used for image acquisition, and objects located in the first space may be acquired and rendered on the screen. The first space may be determined in the following manner. For example, in the viewing frustum of the reference point, a space between a near clipping plane and a far clipping plane may be determined as the first space. In some other embodiments, the first space may also be determined in other suitable ways, which are not limited here.

In one embodiment, the output parameter may be the reference point position. When the reference point position is in different positions, the corresponding acquisition spaces may be different. When the reference point is at a first position, the reference point may correspond to the first space. When the reference point is at a second position, the reference point may correspond to a second space. The second space may be similar to the first space, and both the first space and the second space may be acquisition spaces of the reference point.

In one embodiment, the target object may be the observed object, and the target object may be located in the spatial region where the image is captured by the reference point. Therefore, the target object may be presented in the output image by being captured by the reference point.

In S102, in response to the first condition being met, the output parameter may be possibly adjusted from the first value to a second value. In response to the output parameter being the second value, a second output image about the second space in the virtual space may be obtained based on the second value. The target object may be included in the second space.

In the process of obtaining the image of the target object from S101 to S102, a strategy for automatic adjustment of the output parameter is provided. In response to the first condition being met, the output parameter may be possibly adjusted from the first value to the second value. After the output parameter is adjusted to the second value, the second output image that meets viewing needs may be obtained, without the need for the user to manually adjust the output parameter. The defect that some applications do not provide an output parameter adjustment interface may be also overcame.

In one embodiment, the output parameter may be the position of the reference point, and the reference point may be located in the virtual space. The first value may refer to the first position, and the second value may refer to the second position. Correspondingly, the first output image may be an image about the first space in the virtual space obtained based on the reference point at the first position, and the second output image may be an image about the second space in the virtual space obtained based on the reference point at the second position.

In one embodiment, the strategy for automatic adjustment of the output parameter may include S1021 to S1023.

In S1021, in response to the first condition being met, an influential object of the target object may be determined according to the target object and the reference point.

In one embodiment, in an occlusion scene as an example, the first condition may correspond to the fact that the target object is occluded in the first output image, and the influential object corresponds to an object that causes the target object to be occluded.

In S1022, a second position may be determined based on the influential object.

For example, in one embodiment, the second position may be the position where the influential object is located.

In S1023, the output parameter may be adjusted from the first position to the second position.

In one embodiment, the position of the reference point may be adjusted from the original position to the position of the influential object.

The adjustment strategy provided by the above embodiment may determine the second position based on the influential object, such that the viewing angle of the second position may not change greatly compared with the first position, after the output parameter is adjusted to the second position, ensuring the continuity of the viewing angle.

In one embodiment, the influential object in S1021 may be determined by S10211 to S10213 according to principles of computer graphics imaging.

In S10211, a first target position of the target object in the virtual space and a second target position of the reference point in the virtual space may be obtained.

Figure 3:
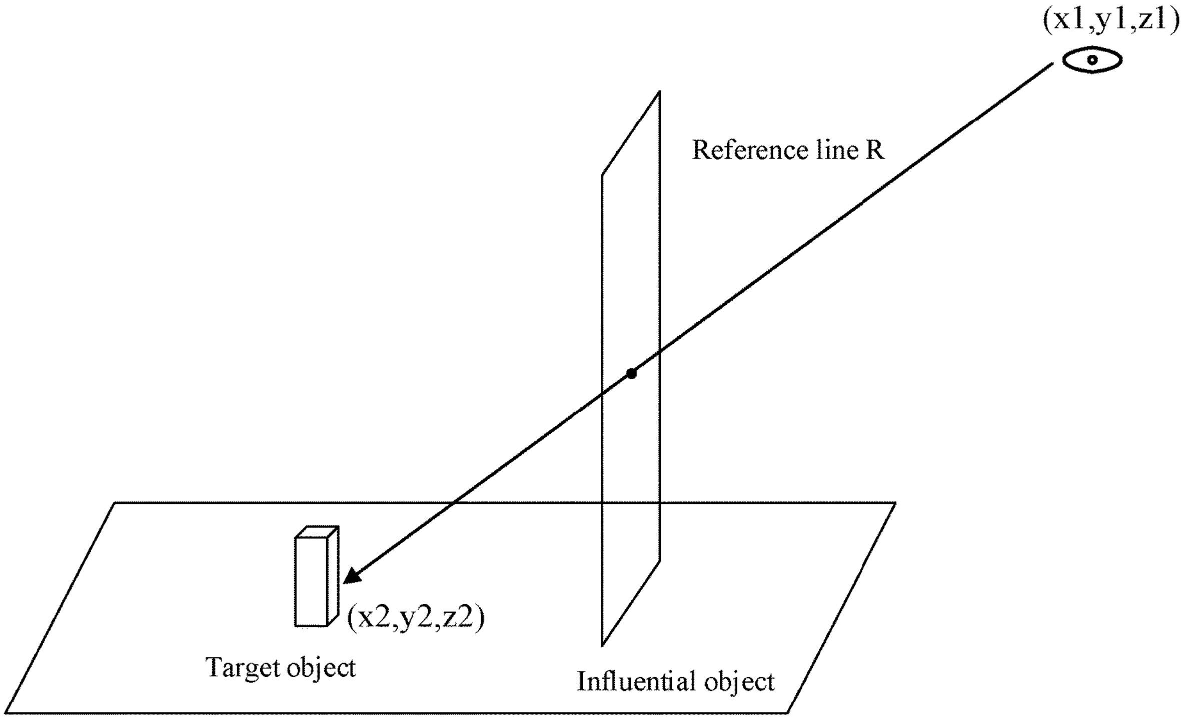
FIG. 3 is a schematic diagram of depth detection in a virtual space consistent with various embodiments of the present disclosure.

In one embodiment shown in FIG. 3 as an example, the position coordinates (x2, y2, z2) of the target object in the virtual space, that is, the first target position, may be obtained. And, the position coordinates (x1, y1, z1) of the reference point in the virtual space, that is, the second target position, may be obtained.

In S10212, based on the first target position and the second target position, a reference line between the target object and the reference point may be obtained.

Based on the position coordinates of the target object and the position coordinates of the reference point, the reference line with a direction may be determined with one of the coordinates as the starting point and the other coordinate as the end point. As shown in FIG. 3, the reference line R (x1-x2, y1-y2, z1-z3) may be obtained.

In S10213, an object that the reference line passes through may be determined as the influential object of the target object.

Figure 4:
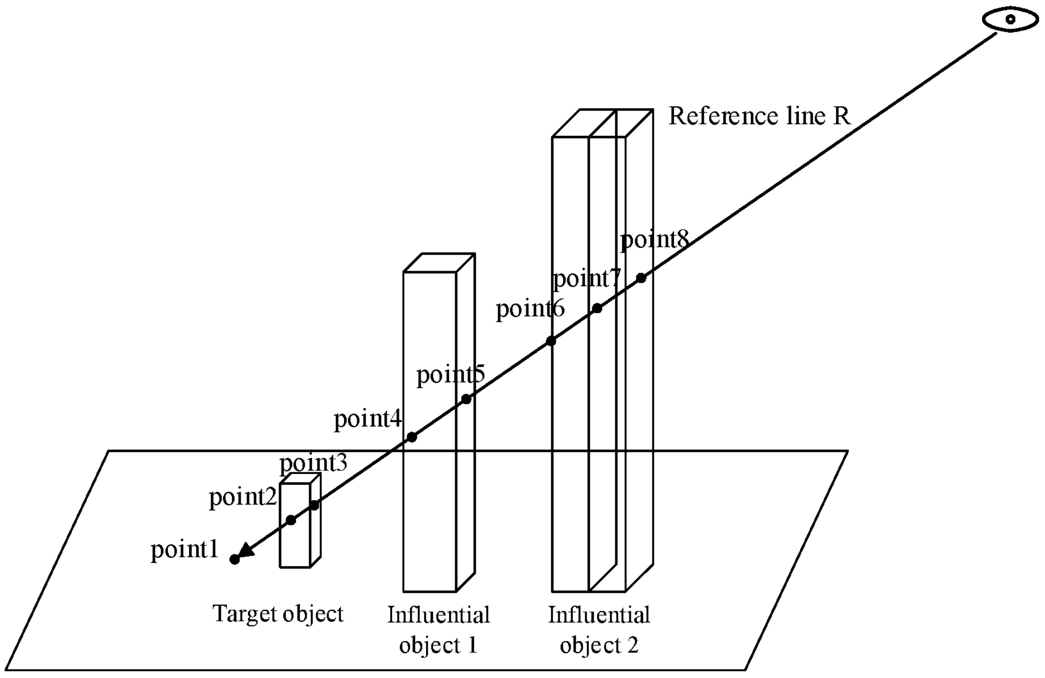
FIG. 4 is a schematic diagram of effective points in a virtual space consistent with various embodiments of the present disclosure.

As shown in FIG. 3 and FIG. 4, for the reference line R pointing from the reference point to the target object, an object that the reference line R passes through may be determined as the influential object of the target object. The reference line R may imitate the line of sight from the reference point to the target object. When the line of sight passes through a non-target object before reaching the target object, the non-target object may inevitably block the target object. Therefore, the non-target object that the reference line passes through may be determined as the influential object of the target object.

In one embodiment, the non-target object that the reference line R passes through may be determined in the following manner. The coordinate set of points included in the reference line R may be called the first coordinate set, and the coordinate set of points included in each non-target object may be called as the second coordinate set. When the first coordinate set overlaps with the coordinates in the second coordinate set of one certain non-target object, the non-target object may be taken as the influential object. For example, as shown in FIG. 4, the points where the first coordinate set coincides with the second coordinate set may be {point2, point3, point4, point5, point6, point7, point8}. When the coordinates of point2 and point3 belong to the coordinates in the second coordinate set of the first object, the first object may be determined as the influential object. Similarly, the second object may be determined as the influential object based on point4 and point5, or the third object may be determined as the influential object based on point6, point7 and point8.

After the influential object is determined, S1022 may be performed to determine the second position based on the influential object.

In some embodiments, as shown in FIG. 4, there may be a plurality of the influential objects. Therefore, there may be different ways to determine the second position based on the plurality of influential objects in S1022.

One of the plurality of influential objects used for determining the second position may be called as a target influential object. First, the target influential object may be determined from the plurality of influential objects, which may be achieved in different ways. Subsequently, after determining the target influential object, there may be multiple ways to determine the second position according to the target influential object. In the first way, the second position may be located on the target influential object. In the second way, the second position may not be located on the target influential object. Further, each of the first way and the second way may be implemented in different manners, as shown in FIG. 2.

Figure 2:
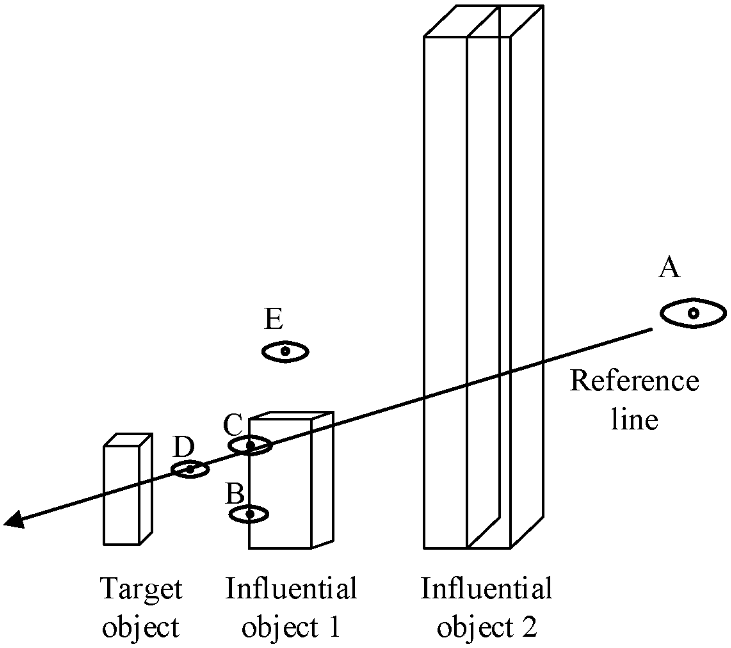
FIG. 2 is a schematic diagram of a first position and a second position consistent with various embodiments of the present disclosure.

As shown in FIG. 2, the first position may be the position of the point A. For the above-mentioned first way where the second position is on the target influential object, the method may include the following manners. In the first manner, the second position may be located on a surface closest to the target object of the target influential object, such as point B. In the second manner, the second position may be located at the intersection of the reference line and the surface of the target influential object, such as point C. For the above-mentioned second way where the second position is not located on the target influential object, the method may include the following manners. In the first manner, the second location may be located on the reference line, such as point D. In the second manner, the second position may not be located on the reference line, but may be located above the horizontal level of the target influential object, such as point E. Since the reference lines leading to the target object from the four positions of B, C, D, and E do not collide with other objects except the target object, by setting the second position at the position of B, C, D, and E, the target object may be kept un-occluded.

In one embodiment, S1022 may include:

S10221: in response to a plurality of influential objects, determining one influential object of the plurality of influential objects which is closest to the target object as the target influential object; and

S10222: determining the second position according to the target influential object.

Figure 5:
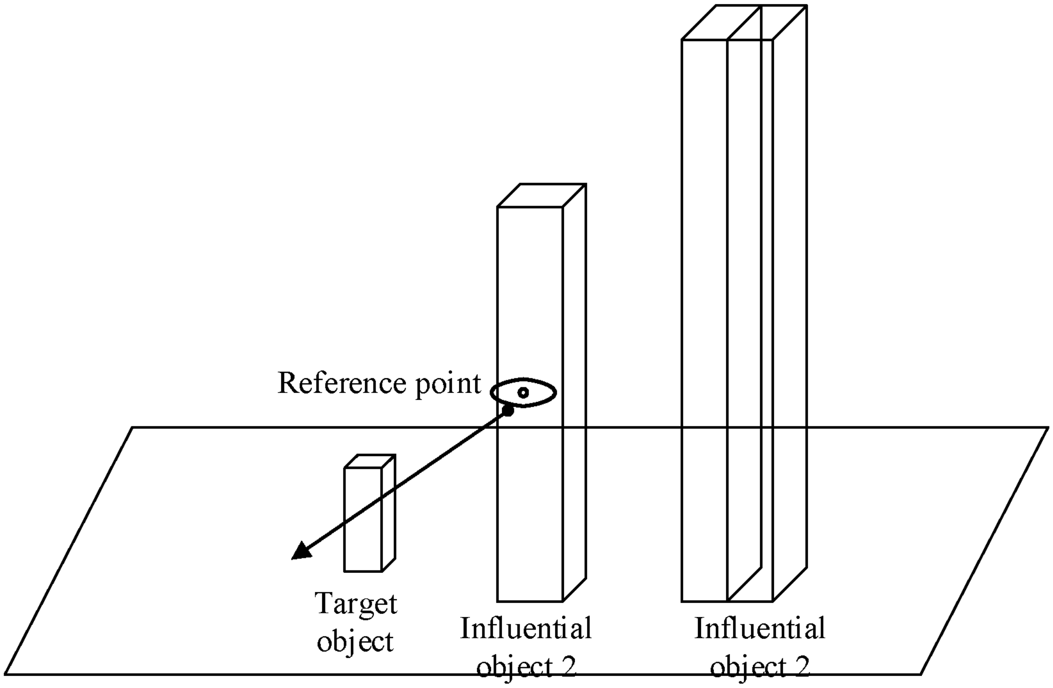
FIG. 5 is a schematic diagram of adjustment of a position of a reference point consistent with various embodiments of the present disclosure.

In one embodiment shown in FIG. 4 and FIG. 5, in S10221, the influential object 1 which is closest to the target object may be selected as the target influential object. In S10222, the second position may be determined according to the target influential object (that is, the influential object 1). The implementation of S10222 may be made reference to the above description about the points B, C, D, and E in FIG. 2.

S10221 and S10222 may ensure that there may be no other objects between the reference point and the target object, thereby ensuring that the target object is able to be displayed without occlusion.

In some other embodiments, another method may be used to solve the problem that the target object is occluded. The method may include adjusting a display parameter of the influential object. The adjusted display parameter may be the transparency of the influential object, and the transparency of the influential object may be adjusted through rendering to make the adjusted transparency higher than the transparency before adjustment. Therefore, the effect that the target object is not occluded may be achieved.

In the above embodiments, when the first condition is satisfied, the output parameter may possibly be adjusted from the first value to the second value. When the first condition includes that the target object is detected to be occluded, adjustment of the output parameters may be performed every time the target object is detected to be occluded. For a hollowed-out model shown in FIG. 6, when the sight of the reference point always follows the target object, as the reference point moves from left to right, the target object may frequently experience switching between being occluded and not being occluded. Therefore, the output parameter may be adjusted frequently, and the output image may also change frequently (called image jitter), which is not good for viewing by users.

To avoid this situation, that is, to prevent image jitter, a second condition may be introduced as an additional trigger condition for adjusting the output parameter. In one embodiment, when the first condition and the second condition are satisfied, the output parameter may be adjusted from the first value to the second value. That is to say, the output parameter may not be adjusted to the second value when the first condition is satisfied. The operation of adjusting the output parameter may be performed only when the second condition is also satisfied.

The present disclosure provides some optional implementations to prevent image jitter.

In one embodiment, the implementation may include: in response to the influential object of the target object being detected and the first condition being met, using the moment when the influential object is detected as a first moment; and, within a first time-interval from the first moment, if the influential object is not detected again, determining that the second condition is met and adjusting the output parameter from the first value to the second value at the second moment after the first time-interval elapses from the first moment. During the first time-interval, if the influential object of the target object is detected at the third moment, the third moment may be taken as the first moment.

In the present embodiment, the image jitter may be prevented by a delayed response. The delayed response may be interpreted as the execution after n seconds of the event being triggered. When the event is triggered repeatedly within the n seconds, the timing may be restarted. In one embodiment using the function f as an example, the function f may be defined as the behavior of adjusting the output parameter, and the delayed response time may be set to 3 seconds (the delayed response time is the first time-interval mentioned above). That is, f may be executed 3 s after being triggered. For example, when we trigger f at t=0, f may be executed at t=3 ideally. If we trigger f again at t=2, f may be executed at t=(2+3)=5.

In another embodiment, another implementation to prevent image jitter may include: determining that the first condition is satisfied when the influential object of the target object is detected; when the influential object has a target label, determining that the second condition is satisfied and adjusting the output parameter from the first value to the second value; and, when the influential object does not have a target label, determining that the second condition is not satisfied to not adjust the output parameter from the first value to the second value.

In this embodiment, prevention of image jitter may be realized by tag response. The tag response may be understood as adjusting the output parameter when the influential object has the target tag and not adjusting the output parameter when the influential object does not have the target tag. The label may be pre-labeled, and the output parameter may be selectively adjusted by pre-labeling the target labels for potentially influential objects. Which potential influential object is marked with the target label may be determined according to many rules. One optional rule may include that: when the ratio of the area of the hollowed-out area of a potential influential object to its total cross-sectional area is small, the potential influential object may be marked with the target label (the hollowed-out area is relatively small, that is, the non-hollowed-out area is large, means that the target object may be blocked by the hollowed-out structure for a long time. Therefore, in response to the target object being blocked by this type of influential object, the reference point position may be adjusted to the second position, which can be adjusted when there is occlusion. Therefore, when the target object is blocked by the non-hollowed-out area, the position of the reference point may be adjusted to the second position, and when the target object is not blocked by the hollowed-out area, the position of the reference point may be adjusted back to the default position, which will less affect the viewing effect). On the contrary, when the ratio of the area of the hollowed-out area of a potential influential object to its total cross-sectional area is large, that is, most of the hollowed-out object is hollowed out, there may be no need to label this type of hollowed-out objects. When the target object is blocked by the small non-hollowed-out area of the hollowed-out object, even if the output parameter is not adjusted, the viewing effect may not be affected too much.

In another embodiment, another implementation to prevent image jitter may include: determining that the first condition is satisfied when the influential object of the target object is detected; and when the number of times that the influential object is detected satisfies the continuous preset number of times, determining that the second condition is met, and adjusting the output parameter from the first value to the second value.

Figure 6:
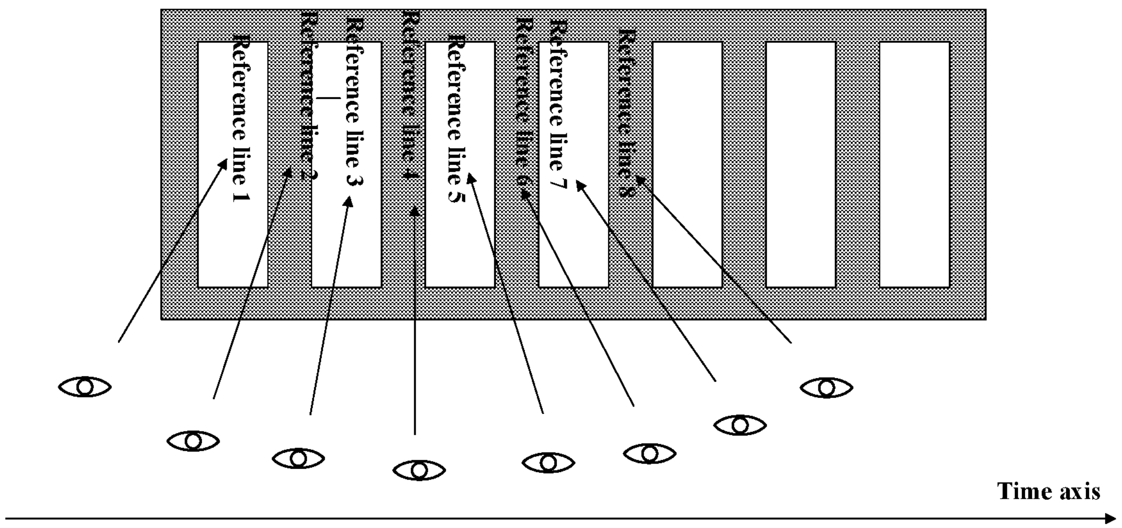
FIG. 6 is a schematic diagram of an exemplary hollowed-out model consistent with various embodiments of the present disclosure.
Figure 7:
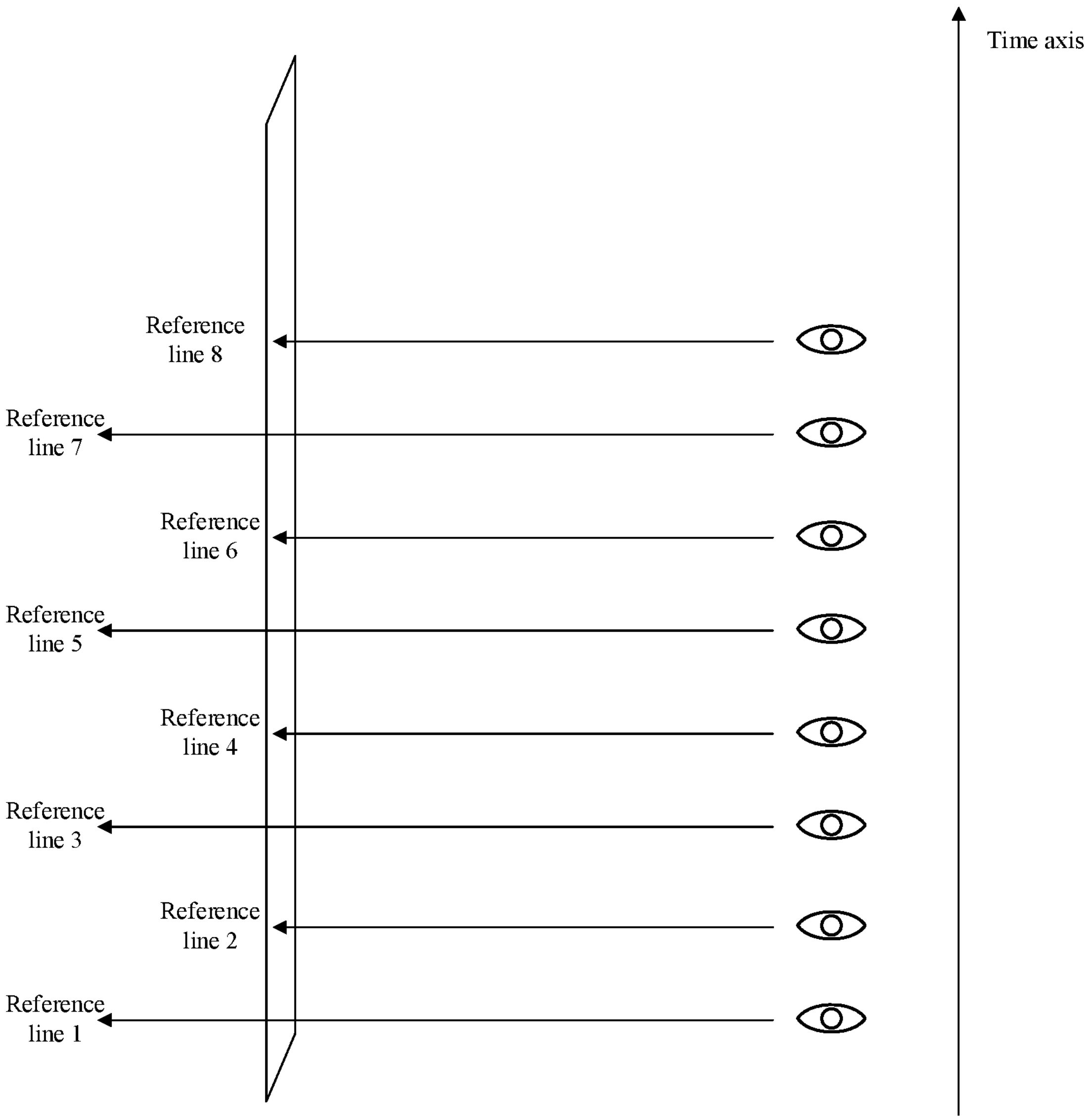
FIG. 7 is a schematic diagram of depth detection on a hollowed-out model consistent with various embodiments of the present disclosure.

As shown in FIG. 6 and FIG. 7 where the hollowed-out model is taken as an example for illustration since the occlusion of the target object by the hollowed-out model is more complicated, FIG. 6 shows the multiple reference lines corresponding to the reference point at different moments when the target object is followed by the angle of view, and the endpoints of these eight reference lines (indicated by the arrows) show the position of the influential object where the reference lines first hit respectively.

In the embodiment shown in FIG. 6 and FIG. 7, Reference line 2, Reference line 4, Reference line 6, and Reference line 8 all hit the hollowed-out model, that is, the influential object is detected, and the first condition is determined to be met. Further, assuming that the number of consecutive preset times is 4 consecutive times, for example, in FIG. 7, when there are 4 consecutive frames corresponding to reference line 2, reference line 4, reference line 6, and reference line 8 each time occlusion detection is performed on each frame, the number of times the influential object is detected is 4 consecutive times, and the second condition is determined to be met and an output parameter adjustment is performed.

Further, in one embodiment, a time limit may be added to the second condition. For example, the second condition may include that: the number of times that the influential object is detected within a certain preset period of time meets the continuous preset number of times. When the second condition is met, the output parameter may be adjusted once. When the number of times that the influential object is detected meets the continuous preset number of times but exceeds the certain preset period of time, the second condition may be determined to be unsatisfied, and the output parameter may be not adjusted. By adding the third condition of time limit, the prevention of image jitter may be further effective.

In addition to the above optional implementations, the second condition may also have other settings. In another embodiment, another implementation to prevent image jitter may include that: when the number of times that the influential object is detected meets the continuous preset number of times and the target distance between the reference points of the continuous preset number of times and the position of the influential object satisfies the similarity condition, the second condition may be determined to be met and the output parameter may be adjusted from the first value to the second value.

For example, in one embodiment the preset number of times may be 4. When the influential object is detected in 4 consecutive image frames, that the target distance between the reference points of the continuous preset number of times and the position of the influential object satisfies the similarity condition may include the following. As shown in FIG. 7 as an example, the four frames of images may correspond to reference line 2, reference line 4, reference line 6, and reference line 8. The positions of the reference point position corresponding to the 4 reference lines and the position of the influential object may be obtained. For each reference line, the difference between the position of the reference point corresponding to the reference line and the position of the influential object may be obtained to obtain the target distance of each of the four reference lines, which are recorded as Distance2, Distance4, Distance6, and Distance8. The target distance satisfying the similarity condition may include that the four target distances are relatively similar, that is, the difference between the four target distances does not exceed the distance threshold. For example, the difference between any two of the four target distances does not exceed the distance threshold, or the difference between adjacent two does not exceed the distance threshold. When the target distances satisfy the similar condition, the second condition may be determined to be met. When the difference between the target distances is too large, the position gap before and after the adjustment of the reference point may be too large when the position of the reference point needs to be adjusted and there may be too many changes between the adjusted image and the pre-adjusted image. Further, the time-interval between two adjacent frames may be very small. Therefore, to avoid frequent large changes in the output image in a short period of time, the condition that the target distances satisfy the similar condition may be added to the second condition, in the present embodiment.

In another embodiment, reducing the frequency of occlusion detection may be also used to prevent image jitter. As the reference point moves, different times may correspond to different reference lines. The intersection points of the reference line and the model in the virtual space at different times may be obtained, and one intersection point closest to the reference point (that is, the first intersection point encountered by the reference line) may be selected as the target intersection point (the target intersection point is on the influential object closest to the reference point), and the distance between the target intersection point and the reference point may be the target distance. Whether the difference of the target distances between two adjacent frames (such as the current frame and the previous frame) is too large may be determined. When the difference is too large, the counter may be cleared; and when the difference is not too large, the counter may be incremented by 1. The difference of the target distances may be compared for every frame, and the counter may be incremented or cleared according to the comparison result. Before the counter is accumulated to 4, as long as the difference is too large once, the counter may be cleared. When the counter is accumulated to 4, the occlusion detection may be performed. The occlusion detection here may include detecting whether there is an influential object between the reference point and the target object.

In this embodiment, the occlusion detection may be performed only once when the target distances are not much different in the accumulative 4 frames. The frequency of occlusion detection may be reduced, to further reduce the number of output parameter adjustments, thereby preventing image jitter.

In another embodiment, another implementation to prevent image jitter may include: when the target object is too much occluded, determining that the second condition is satisfied and adjusting the output parameter; and when the target object is less occluded, determining that the second condition is not satisfied to not adjusting the output parameter. Therefore, the image jitter may be prevented, and the amount of calculation may be reduced to improve the utilization of computing resources.

In another embodiment, the complex hollowed-out model may be rendered with Alpha channel, to visually render the hollowed-out part with a hollowed-out effect. The actual material of the hollowed-out part is not hollowed out, and may still be detected as a block object when the reference hits the hollowed-out part during reference line penetrating. In this case, when such a complex hollowed-out model is detected, the output parameter may be directly adjusted to the second position, and may not return to the first position at the hollowed-out place.

Figure 8:
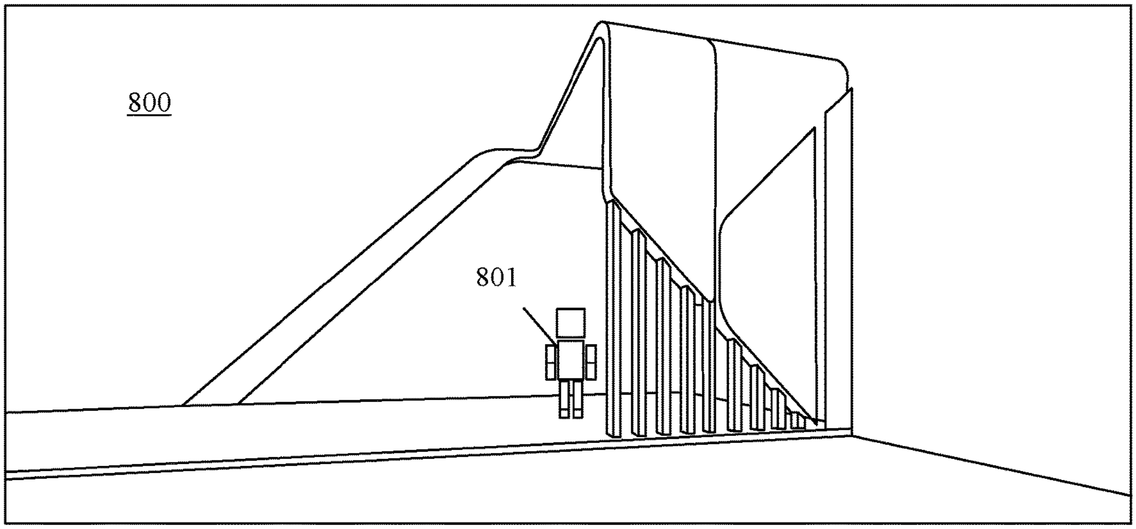
FIG. 8 is a schematic scenery diagram of an exemplary virtual space consistent with various embodiments of the present disclosure.
Figure 9:
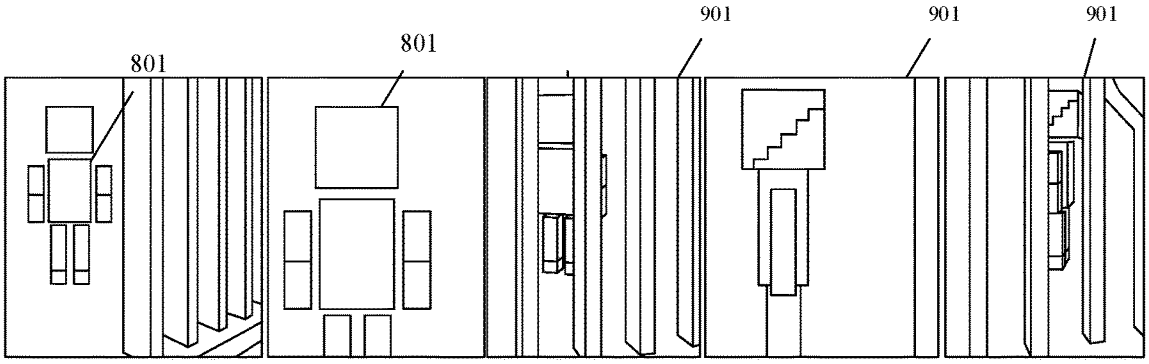
FIG. 9 is a schematic diagram without image jitter prevention and without Alpha channel rendering consistent with various embodiments of the present disclosure.
Figure 10:
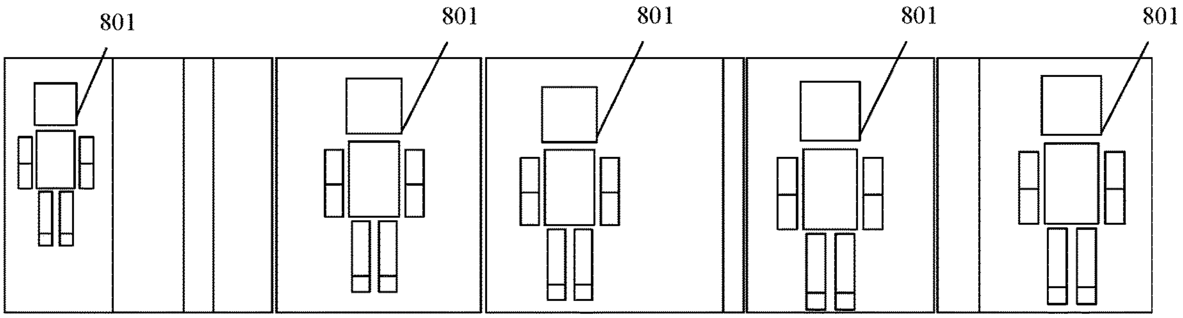
FIG. 10 is a schematic diagram with image jitter prevention and with Alpha channel rendering consistent with various embodiments of the present disclosure.

In a realizable virtual space, FIG. 8 is a schematic diagram of a virtual space 800, FIG. 9 is images of the virtual space 800 without image jitter prevention processing and without Alpha channel rendering, and FIG. 10 is images of the virtual space 800 with image jitter prevention processing and Alpha channel rendering. In FIG. 9, the target object 801 within the viewing angle is blocked multiple times, and dead spots 901 occur in the displayed content. In FIG. 10, by using the data processing method(s) provided by the present disclosure, occlusions can be detected more accurately, and the position of the reference point can be dynamically adjusted, ensuring that no occlusions occur within the viewing angle. Further, complexity of the model and the degree of hollowing out can be ignored, and a perspective experience effect without dead angles can be achieved.

Figure 11:
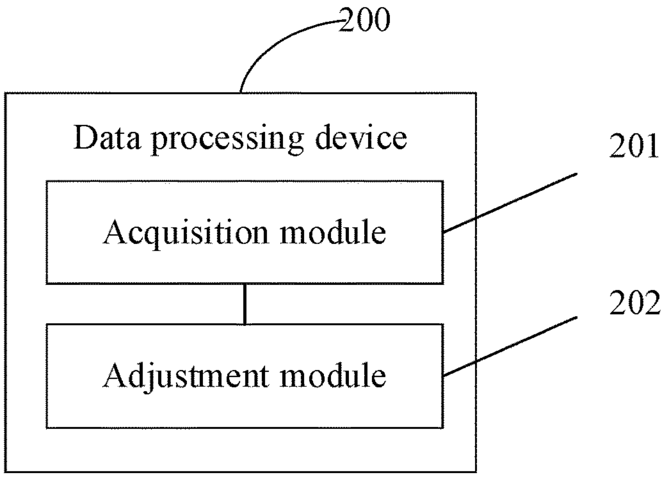
FIG. 11 is a schematic structural diagram of an exemplary data processing device consistent with various embodiments of the present disclosure.

The present disclosure also provides a data processing device. The data processing device may be used to achieve any data processing method provided by various embodiments of the present disclosure. As shown in FIG. 11, in one embodiment, the data processing device 200 may include: an acquisition module 201, configured to acquire an output image in a virtual space according to an output parameter; and an adjustment module 202, configured to adjust the output parameter from a first value to a second value when a first condition is satisfied.

When the output parameter is the first value, the acquisition module 201 may obtain a first output image of the first space in the virtual space. The first space includes a target object. When the output parameter is the second value, the acquisition module 201 may obtain a second output image of the second space in the virtual space, where the second space includes the target object.

In some embodiment, the output parameter may include the position of the reference point in the virtual space. Correspondingly, the first value may include a first position, and the second value may include a second position. The acquisition module 201 may obtain the first output image of the first space in the virtual space by obtaining the first output image about the first space in the virtual space based on the reference point at the first position. The acquisition module 201 may obtain the second output image of the second space in the virtual space by obtaining the second output image about the second space in the virtual space based on the reference point located at the second position. When the first condition is met, the output parameter may be adjusted from the first value to the second value by: determining the influential object of the target object according to the target object and the reference point when the first condition is satisfied; determining the second position based on the influential object; and adjusting the output parameter from the first position to the second position.

In some embodiments, determining the influential object of the target object according to the target object and the reference point may include: obtaining the first target position of the target object in the virtual space and the second target position of the reference point in the virtual space; determining the reference line between the target object and the reference point based on the first target position and the second target position; and determining an object that the reference line passes through as the influential object of the target object.

In some embodiments, determining the second position based on the influential object may include: when there are multiple influential objects, selecting an object closest to the target object as the target influential object; and determining the second position based on the position of the target influential object.

In some embodiment, adjusting the output parameter from the first value to the second value when the first condition is met, may include: when the first condition and the second condition are met, adjusting the output parameter from the first value to the second value.

In some embodiments, when the first condition and the second condition are met, adjusting the output parameter from the first value to the second value may include: when the influential object of the target object is detected, determining that the first condition is met and the moment (e.g., time point) when the influential object is detected as the first moment; within the first time-interval from the first moment, if the influential object is not detected again, determining that the second condition is met, and adjusting the output parameter from the first value to the second value at the second moment after the first time-interval elapses from the first moment; and during the first time-interval, if the influential object is detected at the third moment, determining the third moment as the first moment.

In some other embodiments, when the first condition and the second condition are met, adjusting the output parameter from the first value to the second value may include: when the influential object of the target object is detected, determining that the first condition is met; and when the influential object carries a target label, determining that the second condition is met, and adjusting the output parameter from the first value to the second value.

In some other embodiments, when the first condition and the second condition are met, adjusting the output parameter from the first value to the second value may include: when the influential object of the target object is detected, determining that the first condition is met; and when the number of times that the influential object is detected meets a consecutive preset number, determining that the second condition is met, and adjusting the output parameter from the first value to the second value.

In some other embodiments, when the number of times that the influential object is detected meets the consecutive preset number, determining that the second condition is met, and adjusting the output parameter from the first value to the second value, may include: when the number of times that the influential object is detected meets the consecutive preset number and the influential object meets a distance similarity condition, determining that the second condition is met, and adjusting the output parameter from the first value to the second value.

In the data processing device provided by the present disclosure, when the first condition is met, the output parameter may be able to be adjusted from the first value to the second value. The output parameter is not adjusted from the first value to the second value as long as the first condition is met, but may be adjusted from the first value to the second value. Therefore, the frequent change of the output image induced by the frequent adjustment of the output parameter since the output parameter is adjusted every time the first condition is met may be avoided, to prevent the influence on the visual effect.

Figure 12:
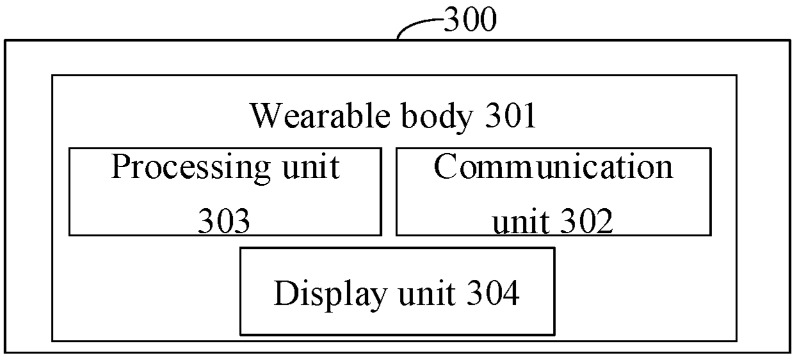
FIG. 12 is a schematic structural diagram of an exemplary wearable device consistent with various embodiments of the present disclosure.

The present disclosure also provides a wearable device. As shown in FIG. 12, in one embodiment, the wearable device 300 may include a wearable body 301 and a wearable assembly (not shown in the figure). The wearable body 301 may include a communication unit 302, a processing unit 303, and a display unit 304.

The communication unit 302 may be connected to a server, at least for receiving a display image of an application program sent by the server and feeding back an instruction operation to the server such that the server is able to obtain the interactive operation that has a mapping relationship with the instruction operation according to the received instruction operation. The processing unit 303 may be configured to control a virtual object to move in the virtual space in response to the movement adjustment operation acting on the virtual object. The processing unit 303 may also be configured to obtain a first output image about a first space in the virtual space based on the first value when the output parameter is the first value. The first space may include the target object. When the first condition is met, the output parameter may be adjusted from the first value to the second value. When the output parameter is the second value, the second output image about the second space in the virtual space may be obtained based on the second value, where the second space may include the target object. Before the server sends the display image to the wearable device 300, the wearable device 300 may establish a connection with the server through the communication unit 302.

The processing unit 303 may be disposed on the wearable body 301. The processing unit 303 may include a processor, configured to execute any data processing method provided by various embodiments of the present disclosure.

The processing unit 303 may include, but is not limited to, a central processing unit (CPU), a microprocessor (MPU), a digital signal processor (DSP), a field programmable gate array (FPGA), or any combination thereof.

The display unit 304 may be configured to display a display image.

In practical applications, the wearable body 301 may include, but not limited to, a shell of the wearable device and peripheral hardware circuits necessary for supporting the normal operation of the communication unit 302 and the processing unit 303.

In the wearable device provided by the present disclosure, when the first condition is met, the output parameter may be able to be adjusted from the first value to the second value. It should be noted that the output parameter is not adjusted from the first value to the second value as long as the first condition is met, but may be adjusted from the first value to the second value. Therefore, the frequent change of the output image induced by the frequent adjustment of the output parameter since the output parameter is adjusted every time the first condition is met may be avoided, to prevent the influence on the visual effect.

Figure 13:
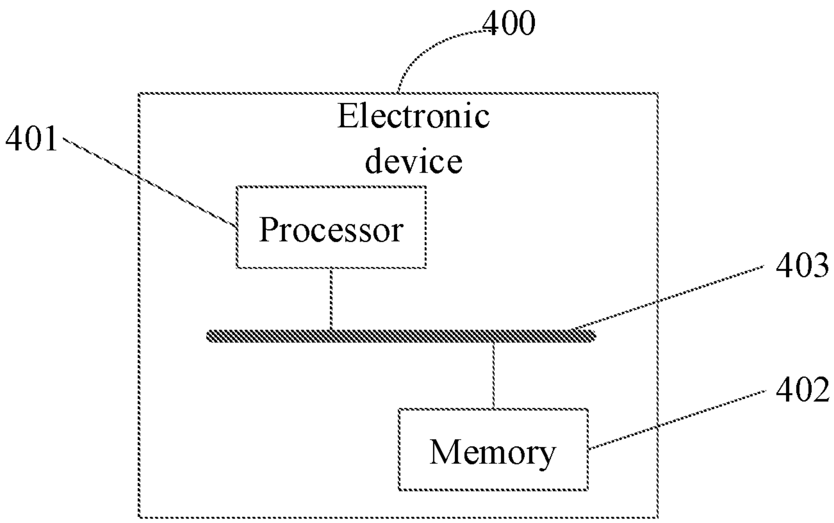
FIG. 13 is a schematic structural diagram of an exemplary electronic device consistent with various embodiments of the present disclosure.

The present disclosure also provides an electronic device. The electronic device may be used to perform any data processing method provided by various embodiments of the present disclosure. As shown in FIG. 13, the electronic device 400 may include a processor 401, a memory 402, and a communication bus 403.

The communication bus 403 may be used to realize the communication connection between the processor 401 and the memory 402.

The processor 401 may be used to execute an information processing program stored in the memory 402, to realize any data processing method provided by various embodiments of the present disclosure.

In one embodiment, as an example, the processor 401 may be an integrated circuit chip with signal processing capabilities, such as a general-purpose processor, a digital signal processor (DSP), a programmable logic device, a discrete gate or transistor logic device, or a discrete hardware component. The general-purpose processor may be a microprocessor or any conventional processor, etc.

The present disclosure also provides a storage medium, e.g., a non-transitory computer readable storage medium, on which executable instructions can be stored, and the executable instructions may be executed by one or more processors to implement any data processing method provided by various embodiments of the present disclosure.

In some embodiments, the storage medium may be a computer-readable storage medium, for example, a ferroelectric memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disc, an optical disc read only memory (CD-ROM), any other memory, or any combination thereof.

Various embodiments of the present disclosure may be provided as methods, systems, or computer program products. Accordingly, the present disclosure may take the form of a hardware embodiment, a software embodiment, or an embodiment combining software and hardware. Furthermore, the present disclosure may take the form of a computer program product embodied on one or more computer-usable storage media (including, but not limited to disk storage and optical storage, etc.) having computer-usable program code embodied therein.

The present disclosure is described with reference to flowcharts and/or block diagrams of methods, devices (systems), and computer program products according to embodiments of the present disclosure. It should be understood that each procedure and/or block in the flowchart and/or block diagram, and a combination of procedures and/or blocks in the flowchart and/or block diagram may be realized by computer program instructions. These computer program instructions may be provided to a general purpose computer, special purpose computer, embedded processor, or processor of other programmable data processing equipment to produce a machine such that the instructions executed by the processor of the computer or other programmable data processing equipment produce an apparatus for realizing the functions specified in one or more procedures of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory may produce a product comprising instruction apparatus. The instruction apparatus may realize the function specified in one or more operations (e.g., steps) of the flowchart and/or one or more blocks of the block diagram.

These computer program instructions can also be loaded onto a computer or another programmable data processing device, causing a series of operational steps to be performed on the computer or other programmable device to produce a computer-implemented process. Therefore, the instructions provide steps for implementing the functions specified in the flow chart or blocks of the flowchart and/or the block or blocks of the block diagrams.

The above description of the disclosed embodiments enables those skilled in the art to make or use the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments shown herein, but is to be accorded the widest scope consistent with the principles and novel features disclosed herein.

What is claimed is:

1. A data processing method comprising:

obtaining a first output image about a first space in a virtual space based on a first value, an output parameter being the first value and the first space including a target object;

in response to a first condition being met, adjusting the output parameter from the first value to a second value; and after the output parameter is adjusted to be the second value, obtaining a second output image of a second space in the virtual space based on the second value, the second space including the target object;

wherein:

the output parameter includes a position of a reference point in the virtual space;

the first value includes a first position and the second value includes a second position, the first position and the second position corresponding to the position of the reference point; and adjusting the output parameter from the first value to the second value includes:

determining an influential object of the target object according to the target object and the reference point;

determining a position located on the influential object as the second position, the second position being located on a surface of the influential object that is closest to the target object; and adjusting the output parameter from the first position to the second position.

2. The method according to claim 1, wherein:

obtaining the first output image of the first space in the virtual space based on the first value includes: obtaining the first output image of the first space in the virtual space based on a reference point located at the first position; and obtaining the second output image of the second space in the virtual space based on the second value includes: obtaining the second output image of the second space in the virtual space based on a reference point located at the second position.

3. The method according to claim 1, wherein determining the influential object of the target object according to the target object and the reference point includes:

obtaining a first target position of the target object in the virtual space and a second target position of the reference point in the virtual space;

based on the first target position and the second target position, determining a reference line between the target object and the reference point; and determining objects that the reference line passes through as the influential object of the target object.

4. The method according to claim 1, wherein determining the position located on the influential object as the second position includes:

in response to presence of multiple of influential objects, selecting an object of the influential objects which is closest to the target object as a target influential object; and determining a position located on the target influential object as the second position.

5. The method according to claim 1, wherein:

in response to the first condition being met, adjusting the output parameter from the first value to the second value includes:

in response to the first condition and a second condition being met, adjusting the output parameter from the first value to the second value.

6. The method according to claim 5, wherein, in response to the first condition and the second condition being met, adjusting the output parameter from the first value to the second value, includes:

in response to the influential object of the target object being detected, determining that the first condition is met and using a moment when the influential object is detected as a first moment;

in response to the influential object being undetected within a first time-interval from the first moment, determining that the second condition is met, and adjusting the output parameter from the first value to the second value at a second moment after the first time-interval elapses from the first moment; and in the first time-interval, in response to the influential object being detected at a third moment, using the third moment as the first moment.

7. The method according to claim 5, wherein, in response to the first condition and the second condition being met, adjusting the output parameter from the first value to the second value, includes:

in response to the influential object of the target object being detected, determining that the first condition is met; and in response to the influential object carrying a target label, determining that the second condition is met, and adjusting the output parameter from the first value to the second value.

8. The method according to claim 5, wherein, in response to the first condition and the second condition being met, adjusting the output parameter from the first value to the second value, includes:

in response to the influential object of the target object being detected, determining that the first condition is met; and in response to a number of times that the influential object is detected meeting a consecutive preset number, determining that the second condition is met, and adjusting the output parameter from the first value to the second value.

9. The method according to claim 8, wherein, in response to the number of times that the influential object is detected meeting the consecutive preset number, determining that the second condition is met and adjusting the output parameter from the first value to the second value include:

in response to the number of times that the influential object is detected meeting the consecutive preset number and target distances between positions of the preset number of reference points and the position of the influential object satisfying a similarity condition, determining that the second condition is met and adjusting the output parameter from the first value to the second value.

10. The method according to claim 1, wherein determining the position located on the influential object as the second position includes determining an intersection point between a reference line connecting the reference point and the target object and the surface of the influential object that is closest to the target object as the second position.

11. An electronic device, comprising a processor, a memory, and a communication bus, wherein:

the communication bus is configured to realize a communication connection between the process and the memory;

the memory is configured to store an information processing program; and the processor is configured to execute the information processing program stored in the memory, to:

obtain a first output image about a first space in a virtual space based on a first value, an output parameter being the first value and the first space including a target object;

in response to a first condition being met, adjust the output parameter from the first value to a second value; and after the output parameter is adjusted to be the second value, obtain a second output image of a second space in the virtual space based on the second value, the second space including the target object;

wherein:

the output parameter includes a position of a reference point in the virtual space;

the first value includes a first position and the second value includes a second position, the first position and the second position corresponding to the position of the reference point; and adjusting the output parameter from the first value to the second value includes:

determining an influential object of the target object according to the target object and the reference point;

determining a position located on the influential object as the second position, the second position being located on a surface of the influential object that is closest to the target object; and adjusting the output parameter from the first position to the second position.

12. The electronic device according to claim 11, wherein:

the first output image of the first space in the virtual space based on the first value is obtained by: obtaining the first output image of the first space in the virtual space based on a reference point located at the first position; and the second output image of the second space in the virtual space based on the second value is obtained by: obtaining the second output image of the second space in the virtual space based on a reference point located at the second position.

13. The electronic device according to claim 11, wherein the processor is further configured to:

obtain a first target position of the target object in the virtual space and a second target position of the reference point in the virtual space;

based on the first target position and the second target position, determine a reference line between the target object and the reference point; and determine objects that the reference line passes through as the influential object of the target object.

14. The electronic device according to claim 11, wherein the processor is further configured to:

in response to presence of multiple of influential objects, select an object of the influential objects which is closest to the target object as a target influential object; and determine a position located on the target influential object as the second position.

15. The electronic device according to claim 11, wherein:

in response to the first condition being met, the output parameter from the first value to the second value is adjusted by:

in response to the first condition and a second condition being met, adjusting the output parameter from the first value to the second value.

16. The electronic device according to claim 15, wherein the processor is further configured to:

in response to the influential object of the target object being detected, determine that the first condition is met and using a moment when the influential object is detected as a first moment;

in response to the influential object being undetected within a first time-interval from the first moment, determine that the second condition is met, and adjust the output parameter from the first value to the second value at a second moment after the first time-interval elapses from the first moment; and in the first time-interval, in response to the influential object being detected at a third moment, use the third moment as the first moment.

17. The electronic device according to claim 15, wherein the processor is further configured to:

in response to the influential object of the target object being detected, determine that the first condition is met; and in response to the influential object carrying a target label, determine that the second condition is met, and adjust the output parameter from the first value to the second value.

18. The electronic device according to claim 15, wherein the processor is further configured to:

in response to the influential object of the target object being detected, determine that the first condition is met; and in response to a number of times that the influential object is detected meeting a consecutive preset number, determine that the second condition is met, and adjusting the output parameter from the first value to the second value.

19. The electronic device according to claim 18, wherein the processor is further configured to:

in response to the number of times that the influential object is detected meeting the consecutive preset number and target distances between positions of the preset number of reference points and the position of the influential object satisfying a similarity condition, determine that the second condition is met and adjust the output parameter from the first value to the second value.

20. A non-transitory computer readable storage medium, configured to store an information processing program, wherein:

the information processing program is configured to be executed by a device where the non-transitory computer readable storage medium is located, to control the device to:

obtain a first output image about a first space in a virtual space based on a first value, an output parameter being the first value and the first space including a target object;

in response to a first condition being met, adjust the output parameter from the first value to a second value; and after the output parameter is adjusted to be the second value, obtain a second output image of a second space in the virtual space based on the second value, the second space including the target object;

wherein:

the output parameter includes a position of a reference point in the virtual space;

the first value includes a first position and the second value includes a second position, the first position and the second position corresponding to the position of the reference point; and adjusting the output parameter from the first value to the second value includes:

determining an influential object of the target object according to the target object and the reference point;

determining a position located on the influential object as the second position, the second position being located on a surface of the influential object that is closest to the target object; and adjusting the output parameter from the first position to the second position.

* * * * *